Dec. 2, 1930.  H. R. DRYDEN  1,783,874
SAFETY HOLDING DEVICE FOR FLASH LIGHTS
Filed Dec. 4, 1929
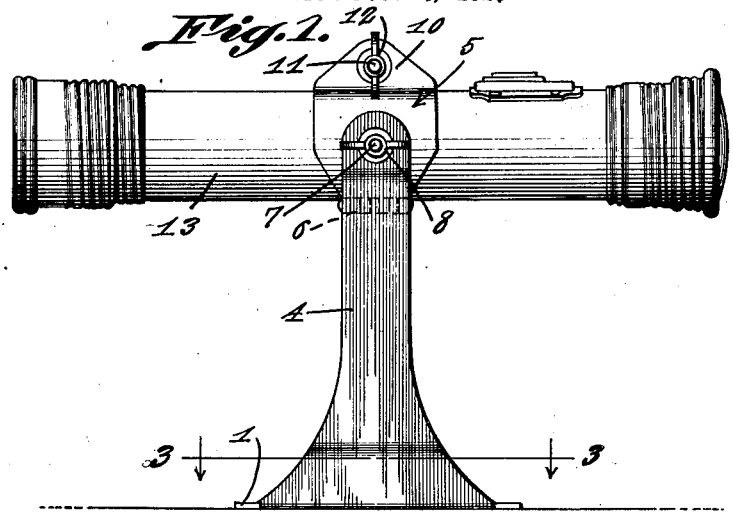
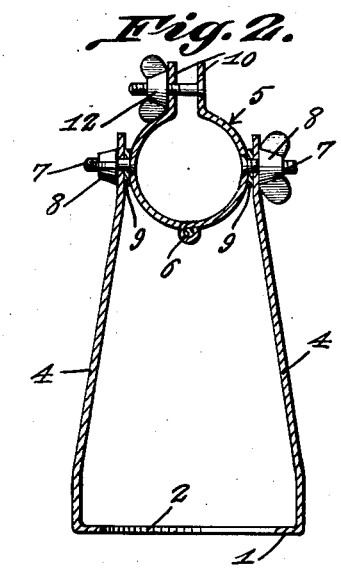
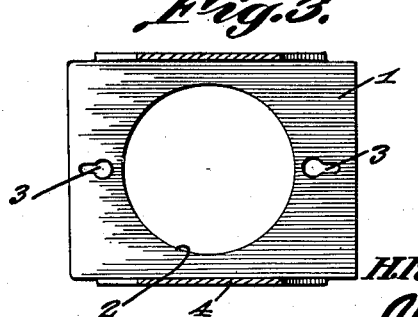
H. R. Dryden, INVENTOR
BY Victor J. Evans
ATTORNEY Patented Dec. 2, 1930

1,783,874

UNITED STATES PATENT OFFICE

HARRY R. DRYDEN, OF PITTSBURGH, PENNSYLVANIA

SAFETY HOLDING DEVICE FOR FLASH LIGHTS

Application filed December 4, 1929. Serial No. 411,652.

The object of this, my present invention is the provision of a holder for flash lights, of a construction whereby the flashlight may be hung from an elevated part, supported upon the floor of a building, and held so that the flashlight may have its lens end arranged at any desired angle, so that the rays of light may be thrown upon objects to be operated upon without necessitating the operator holding the flashlight.

To the attainment of the foregoing the invention consists in the improvement hereinafter described and definitely claimed.

In the drawings:

Figure 1 is a side elevation of my improvement with the flashlight clamped thereon.

Figure 2 is an approximately central transverse sectional view through the improvement.

Figure 3 is a horizontal sectional view on the line 3—3 of Figure 1.

As disclosed by the drawings the improvement comprises a flat and substantially rectangular metal base 1. The base is of a size whereby the same may be effectively sustained upon a support without liability of the weight of the flashlight (which is clamped to the improvement) tilting the holder.

The base is provided with a central round opening 2 and to the opposite sides of the opening with T-hole slots or openings 3.

Arising from two of the opposite edges of the base there are the spring sides 4 of the improvement. These sides gradually decrease in width from their connection with the base to their upper or outer ends thereof and by reference to the drawings it will be noted that the sides, at their connection with the base are of a less width than the length of the base. The numeral 5 indicates broadly a two-part ring clamp. The sections of the clamp are hingedly connected together, as at 6. Each of the clamp sections, on its sides has fixed thereon an outwardly projecting threaded stud 7, the said studs passing through suitable and alining openings in the sides 4 of the holder adjacent to the upper end thereof. These threaded studs or short bolts 7 are engaged by wing nuts 8 and there are preferably arranged between the sides of the holder and the sides of the split clamp 5 bearing washers 9. The clamp sections have outwardly extending ear portions 10, one of which carries a bolt or stud 11 to pass through an opening in the second ear and this bolt or stud is engaged by a wing nut 12. The flashlight 13 has its barrel portion received in the clamp 5. To accomplish this the wing nut 12 is removed from the stud or bolt 11, and the spring sides 4 of the holder, which exert an outward pressure with respect to each other will respectively open the clamp 5 so that the barrel of the flashlight may be readily arranged therein and effectively secured on the holder when the nut 12 is again screwed on the stud or bolt 11.

By slightly adjusting the nuts 8 the clamp 5 on the flashlight held thereby may be swung to any desired angle and effectively sustained at such angle. The rays of light from the flashlight may be directed through the opening 2 in the base 1 as when the operator desires to inspect the interior of a pipe or like hollow object, the base, of course, providing a support when the flashlight is in this position. The flashlight can be held from either a vertical or horizontal support by hooks which are received through the key hole slots 3 or by screws whose heads pass through the widened openings in the slots and are moved into the restricted openings thereof.

The construction and advantages of the improvement will, it is thought, be apparent to those skilled in the art to which such invention relates so that further detailed description will not be required.

Having described the invention, I claim:

A holder for flashlights, comprising a metal member provided with a substantially rectangular base, spring sides arising from two of the opposite edges of the base and gradually decreasing in thickness from the juncture of the base to the outer end, a ring clamp comprising two hingedly connected sections having threaded studs extending therefrom and received through openings in the sides of the base and designed to be engaged by wing nuts, the said sides of the base exerting an outward pressure with respect to each other, outwardly projecting ears on the ring clamp sections, a threaded stud carried by one of said ears passing through the other ear and engaged by a wing nut.

In testimony whereof I affix my signature.

HARRY R. DRYDEN.